United States Patent
Michalski et al.

(10) Patent No.: US 7,278,365 B2
(45) Date of Patent: Oct. 9, 2007

(54) MECHANICALLY WELDED STRUCTURE WITH STRESS-RELIEVING SLIT AND LIQUEFIED GAS TRANSPORT SHIP EQUIPPED WITH SUCH A STRUCTURE

(75) Inventors: Pierre Michalski, Chevreuse (FR); Karim Chapot, Prunay en Yvelines (FR)

(73) Assignee: Gaztransport & Technigaz, Saint-Remy-les-Chevreuse (FR)

( * ) Notice: Subject to any disclaimer, the term of this patent is extended or adjusted under 35 U.S.C. 154(b) by 0 days.

(21) Appl. No.: 10/684,578

(22) Filed: Oct. 15, 2003

(65) Prior Publication Data

US 2004/0118330 A1 Jun. 24, 2004

(30) Foreign Application Priority Data

Nov. 22, 2002 (FR) .................................. 02 14674

(51) Int. Cl.
*B63B 3/00* (2006.01)
*B63B 3/26* (2006.01)
*B63B 3/56* (2006.01)
*B23K 31/02* (2006.01)
*F17C 13/08* (2006.01)

(52) U.S. Cl. ................. 114/65 R; 114/74 R; 114/79 W; 228/174; 428/596

(58) Field of Classification Search ............. 114/65 R, 114/74 A, 78, 79 R, 79 W, 88, 74 R, 74 T; 52/729.1; 403/270; 428/596, 615; 228/174

See application file for complete search history.

(56) References Cited

U.S. PATENT DOCUMENTS

| | | | | | |
|---|---|---|---|---|---|
| 2,729,184 | A | * | 1/1956 | Bagsar .................... | 114/79 R |
| 2,802,596 | A | * | 8/1957 | Weil ......................... | 220/634 |
| 2,822,897 | A | * | 2/1958 | Peterson .................... | 403/270 |
| 3,101,861 | A | * | 8/1963 | Mearns III, et al. .... | 220/560.08 |
| 3,535,768 | A | * | 10/1970 | Delacey et al. ............. | 228/178 |
| 3,922,987 | A | * | 12/1975 | Tornay ..................... | 114/74 A |
| 3,941,272 | A | * | 3/1976 | McLaughlin ........... | 220/560.11 |

(Continued)

FOREIGN PATENT DOCUMENTS

GB 0818835 A * 8/1959

(Continued)

OTHER PUBLICATIONS

Aström et al., *Welding in the World 36*, 181-189 (1995).

(Continued)

*Primary Examiner*—Ajay Vasudeva
(74) *Attorney, Agent, or Firm*—Leydig, Voit & Mayer, Ltd.

(57) ABSTRACT

A mechanically welded structure comprising a first flat and thin metallic structural element extending in a plane and delimited by a straight edge on one side, and a second metallic structural element welded to the straight edge of the first structural element, or welded to an intermediate element connected to the straight edge and inserted between the first and second structural elements, the second structural element exerting, at least one point of the straight edge, a force resolving into at least one component extending in said plane perpendicularly to the straight edge, wherein the first structural element has a stress-relieving slit extending parallel to the straight edge and situated facing the point at which said force is exerted.

16 Claims, 4 Drawing Sheets

U.S. PATENT DOCUMENTS

| | | | | |
|---|---|---|---|---|
| 4,097,716 A | * | 6/1978 | Reichelt et al. | ......... 219/137 R |
| 5,375,547 A | * | 12/1994 | Abe et al. | ................. 114/74 A |
| 5,680,738 A | * | 10/1997 | Allen et al. | ................. 52/729.1 |
| 6,009,821 A | | 1/2000 | Al-Rammah et al. | |
| 6,237,303 B1 | * | 5/2001 | Allen et al. | ................. 52/729.1 |

FOREIGN PATENT DOCUMENTS

| | | | | |
|---|---|---|---|---|
| JP | 54137446 A | * | 10/1979 | |
| JP | 56117899 A | * | 9/1981 | |
| JP | 62163887 A | * | 7/1987 | |
| JP | 04078685 A | * | 3/1992 | |
| JP | 04078686 A | * | 3/1992 | |
| JP | 04243683 A | * | 8/1992 | |
| JP | 05319360 A | * | 12/1993 | |
| JP | 06039580 A | * | 2/1994 | |
| JP | 07096883 A | * | 4/1995 | |
| JP | 08058677 A | * | 3/1996 | |
| JP | 08108882 A | * | 4/1996 | |
| JP | 09096016 A | * | 4/1997 | |
| JP | 09221094 A | * | 8/1997 | |
| JP | 2000255996 A | * | 9/2000 | |

OTHER PUBLICATIONS

Petershagen, *Soudage et Techniques Connexes*, 29-34, Jun. 1999.

Müller, *Technica*, 797-804, Oct. 1983.

* cited by examiner

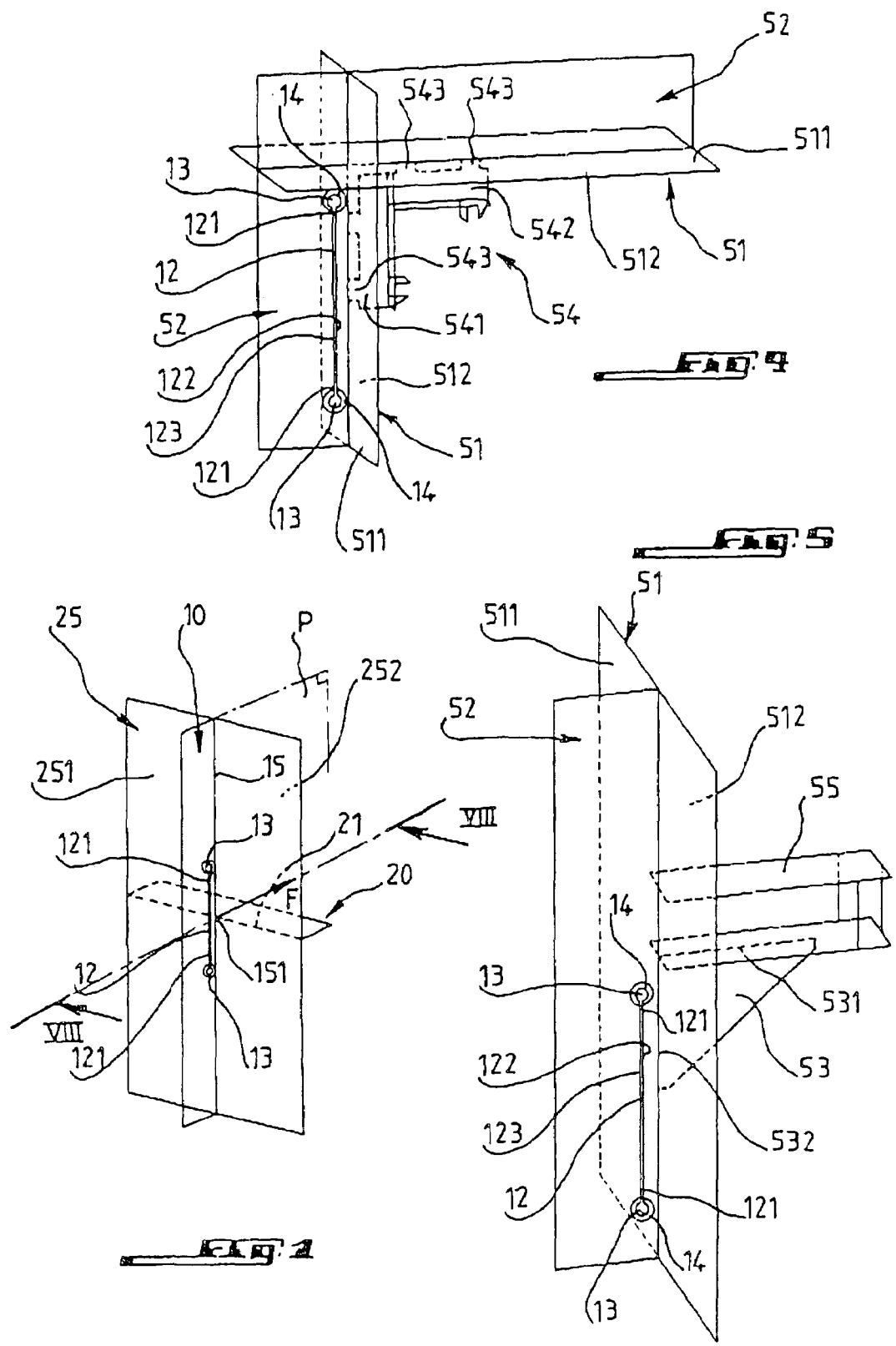

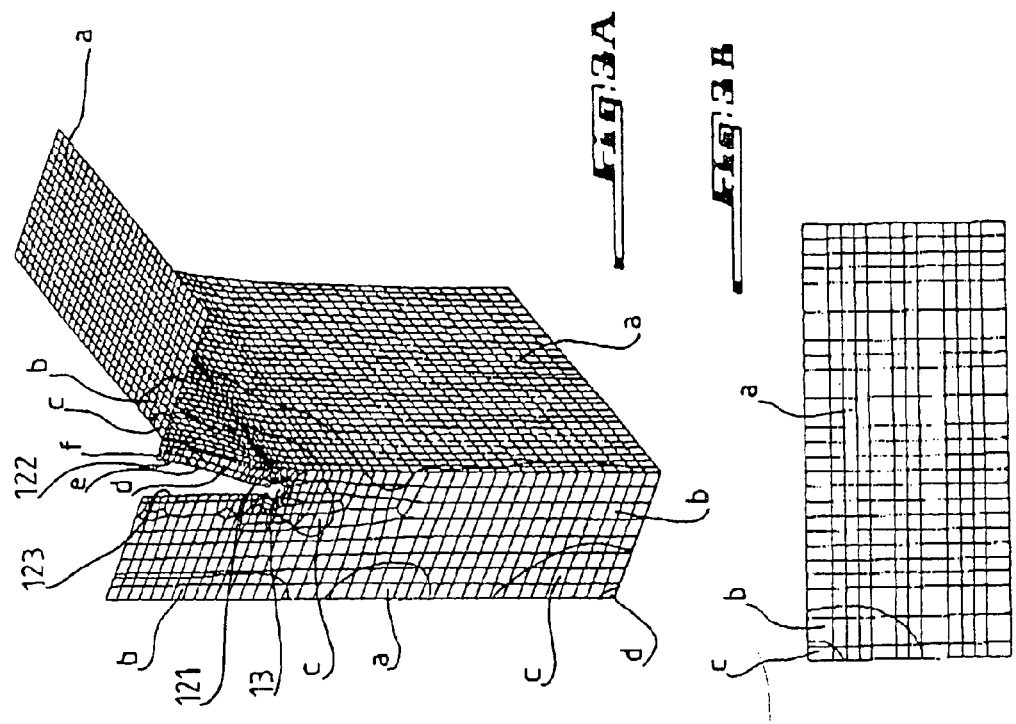
Fig. 3A
Fig. 3B
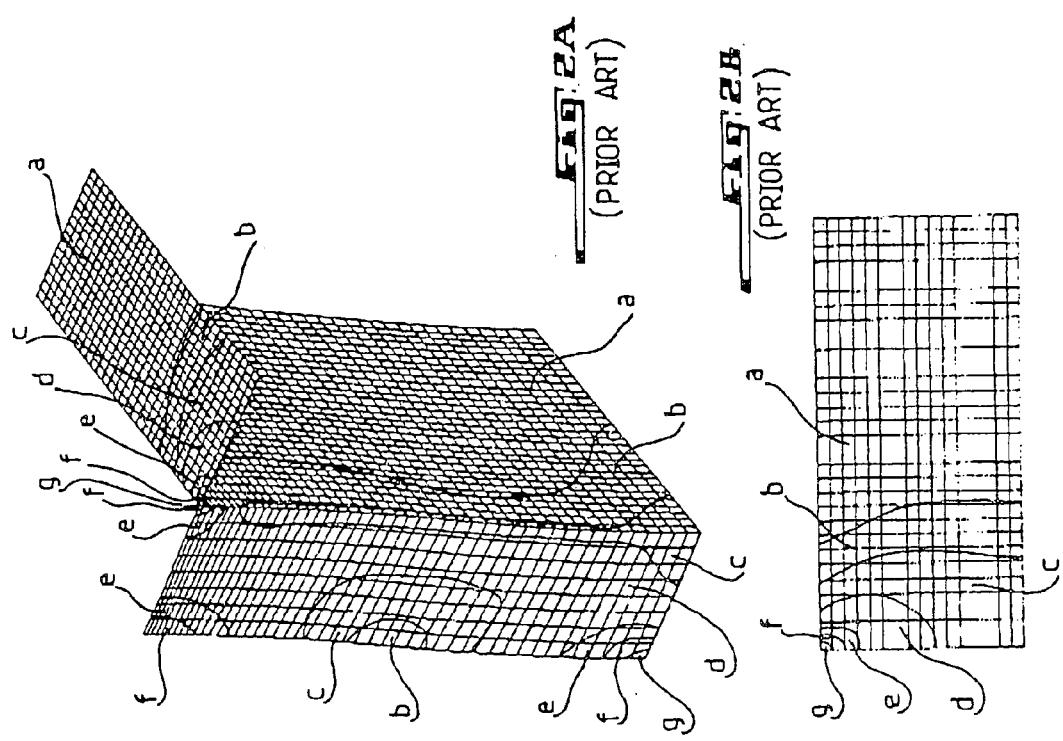
Fig. 2A (PRIOR ART)
Fig. 2B (PRIOR ART)

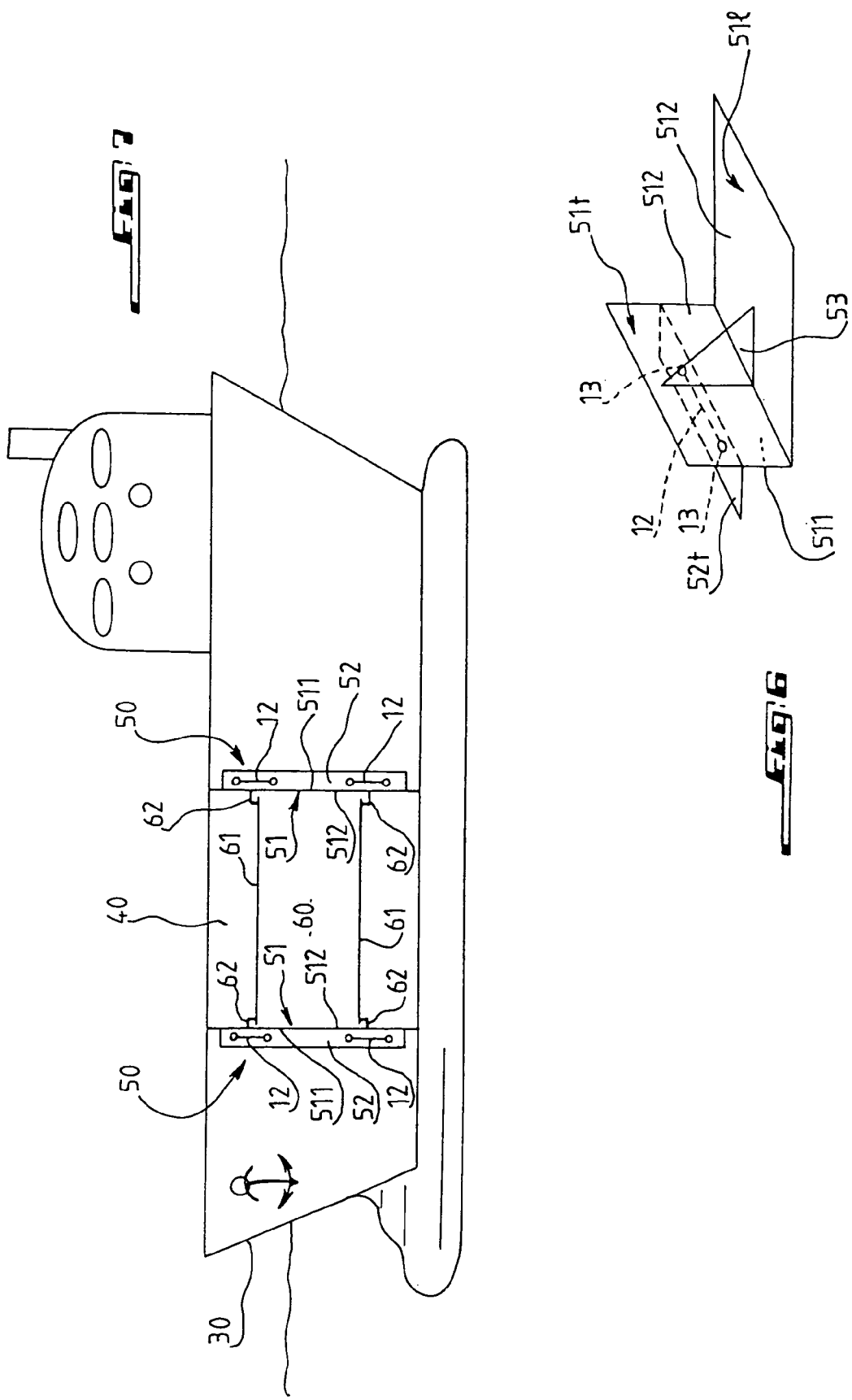

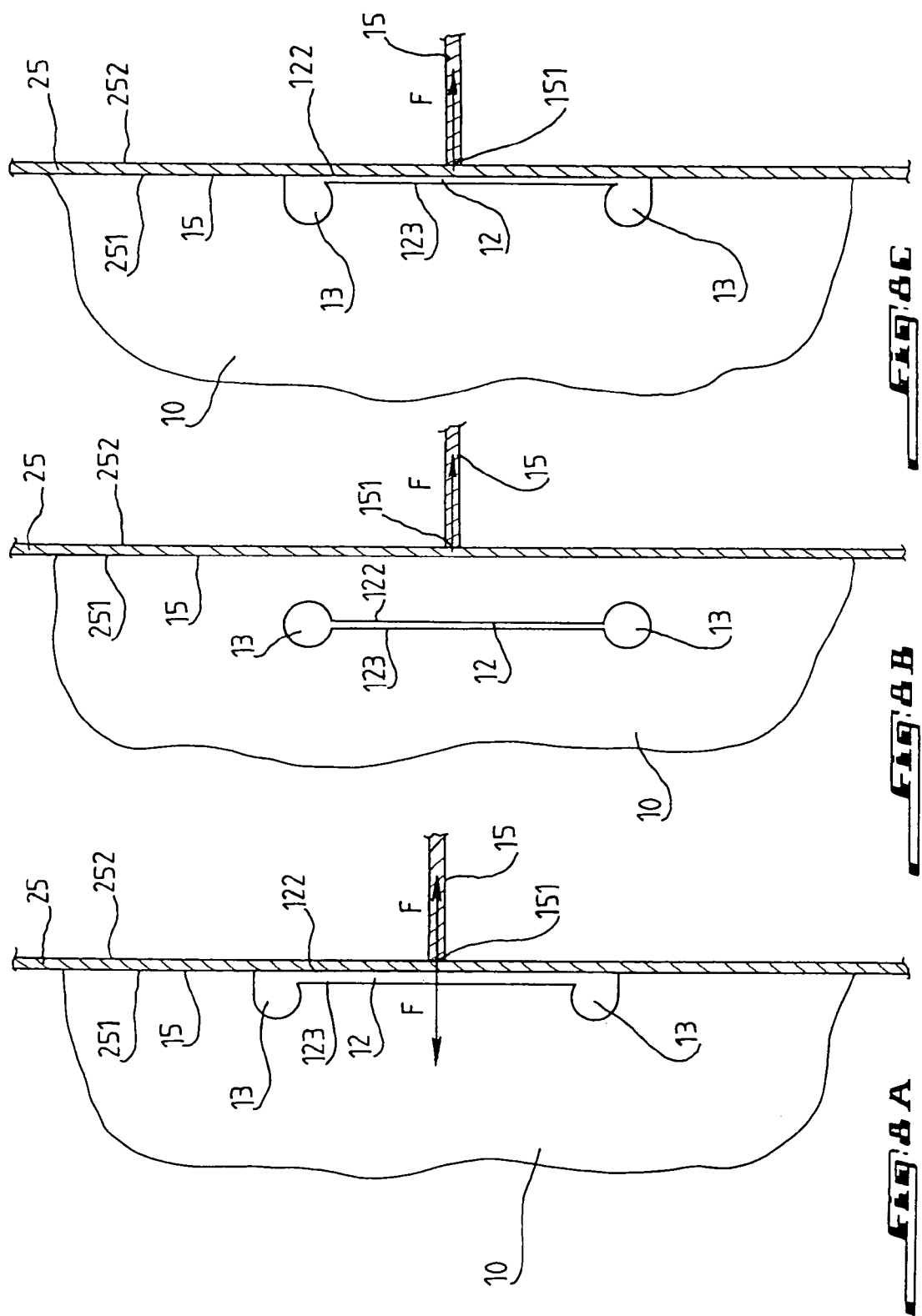

MECHANICALLY WELDED STRUCTURE WITH STRESS-RELIEVING SLIT AND LIQUEFIED GAS TRANSPORT SHIP EQUIPPED WITH SUCH A STRUCTURE

The invention generally relates to the metal construction industry.

More precisely, according to a first aspect, the invention relates to a mechanically welded structure that has a first flat and thin metallic structural element extending in a plane and delimited by a straight edge on one side, and a second metallic structural element welded to the straight edge of the first structural element, or on an intermediate element connected with this straight edge and inserted between the first and second structural elements, the second structural element exerting, at least one point of the straight edge, a force which resolves into at least one component extending in said plane perpendicularly to the straight edge.

Structures of this type are known in the prior art and are used in all sorts of metal constructions.

They are used in particular for the construction of liquefied gas transport ships known as methane carriers.

A methane carrier is divided into a number of cells, each containing a tank for liquefied gas. Each tank has primary and secondary membranes for containment of the gas that are attached to anchoring bars welded to the walls of the cell. A primary thermal insulation arrangement insulates the primary barrier from the secondary barrier, and a secondary thermal insulation arrangement insulates the secondary barrier from the walls of the cell. Stiffeners in the form of ribs are welded to the exterior surfaces of the walls.

The stiffener, the anchoring bar and the wall of the cell constitute a mechanically welded structure of the type described above, and correspond respectively to the first structural element, to the second structural element and to the intermediate element.

These ships have the defect that the weld seams of certain anchoring bars on the walls of the cell are subjected to extensive fatigue stress.

In effect, these weld seams are subjected to a permanent load resulting from the stress applied to the anchoring bars by the membranes. These membranes are subjected to very low temperatures when the tank is filled with liquefied gas, and they contract, pulling the anchoring bars towards the interior of the cell.

Furthermore, the ship undergoes cycles of alternating elongations and longitudinal compressions caused by the swell. The cyclic stresses generated by these elongations and compressions add to the permanent load on the weld seams.

When the anchoring bars are situated at particularly stiff wall locations, fatigue failures in certain weld seams can occur after several years of operation of the ship. This is the case in particular when the anchoring bar is situated near a stiffener, and especially when the anchoring bar and the stiffener are arranged facing one another, on either side of the wall, and intersect as illustrated in FIG. 1.

In this context, the present invention aims to remedy the defect mentioned above.

For this purpose, the structure of the invention, otherwise in accordance with the generic definition given for it in the preamble above, is essentially characterized by the fact that the first structural element has a stress-relieving slit extending parallel to the straight edge, and situated facing the point at which said force is applied.

In a possible embodiment of the invention, the stress-relieving slit is arranged in the immediate vicinity of the straight edge.

Advantageously, the stress-relieving slit at rest is less than 2 cm wide.

Preferably, the first structural element has a shape elongated in a direction parallel to the straight edge, the first structural element having, perpendicular to said direction, a first dimension at the level of the point at which the force is applied, the stress-relieving slit having according to said direction a length greater than said first dimension.

For example, the stress-relieving slit, at two opposite ends, opens into circular holes drilled in the first structural element, these holes having a diameter which is at least three times the width of the stress-relieving slit.

Advantageously, the first structural element is reinforced around the circular holes by backing plates.

According to a second aspect, the invention relates to a liquefied gas transport ship which has a hull, a cell delimited by partitions connected to the hull, and a liquefied gas storage tank arranged in the cell, at least one of the partitions of the cell being a mechanically welded structure of the type described in the preceding, this partition having a wall constituting the intermediate element, at least one stiffener welded to an exterior surface of the wall opposite from the storage tank and constituting the first structural element, and a piece welded to an interior surface of the wall opposite from the exterior surface, such as a stiffening gusset or an anchoring element, this piece constituting the second structural element.

Advantageously, the second structural element is an anchoring element, the storage tank having a liquefied gas containment membrane attached to this anchoring element, the force applied on the stiffener being generated by the stress applied to the anchoring element by the containment membrane.

Preferably, the anchoring element is an anchoring bar extending in a plane perpendicular to the stiffener.

For example, the wall extends in a plane perpendicular to the normal direction of movement of the ship, the stiffener extending in a plane perpendicular to the wall.

Other characteristics and advantages of the invention will emerge clearly from the description given for it below, in an indicative and non-limiting way, with reference to the appended figures, among which:

FIG. 1 is an oblique view of a first embodiment of a mechanically welded structure according to the invention, FIG. 2A is a graphic representation of the stress levels in a lower quarter of the structure of FIG. 1 for a typical loading case in the absence of stress-relieving slit, FIG. 2B being an enlarged top view of the stresses in the second structural element, FIG. 3A is a view equivalent to FIG. 2A, for a structure provided with a stress-relieving slit, FIG. 3B being an enlarged top view of the stresses in the second structural element, FIG. 4 is an oblique view of a first example of a mechanically welded structure of a gas transport ship according to the invention, FIG. 5 is an oblique view of a second example of a mechanically welded structure of a liquefied gas transport ship according to the invention, FIG. 6 is perspective view of a third example of a mechanically welded structure of a liquefied gas transport ship according to the invention, FIG. 7 is a simplified schematic representation of a ship according to the invention, and FIGS. 8A to 8C are cross sections in the plane defined by arrows VIII of FIG. 1, representing three embodiment variants of the stress-relieving slit.

The mechanically welded structure represented in FIG. 1 has first flat and thin metallic structural element 10 extending in plane P, this element being delimited on one side by straight edge 15, and second metallic structural element 20 welded to intermediate element 25 connected with this straight edge 15.

Intermediate element 25 is inserted between first and second structural elements 10 and 20, second structural element 20 exerting, at least one point 151 of straight edge 15, a force F which resolves into at least one component extending in plane P perpendicularly to straight edge 15.

In FIG. 1, intermediate element 25 is a flat metallic plate, first structural element 10 being a rib welded to first surface 251 of plate 25, and second structural element 20 being another rib welded to second surface 252 of the plate opposite from the first.

Second structural element 20 has straight attachment edge 21 welded to plate 25.

First and second structural elements 10 and 20 are arranged facing one another, on either side of wall 25, and intersect at a right angle.

Point 151 at which force F is applied corresponds to the point of intersection of first and second structural elements 10 and 20.

Plane P in which first structural element 10 extends is essentially perpendicular to plate 25. Likewise, second structural element 20 extends in a plane perpendicular to plate 25.

According to the invention, first structural element 10 has stress-relieving slit 12 extending parallel to straight edge 15, and situated facing point 151 at which force F is applied.

One indeed sees the advantage of this stress-relieving slit by comparing FIGS. 2A and 2B with FIGS. 3A and 3B.

FIG. 2A represents the stress levels in the mechanically welded structure for a typical loading case, in the absence of a stress-relieving slit. The structure is divided into zones by equal stress lines, and a code characterizing the stress level is assigned to each zone. The code can take the values a, b, c, d, e, f, or g, coding increasing stress levels in that order.

It is seen in FIGS. 2A and 2B that the zone situated around point 151 of intersection between first and second structures 10 and 20 is assigned the code g.

The stresses on the weld seam of second structural element 20 progressively decrease roughly concentrically, moving away from point 151, from g to a, as can be seen in FIG. 2B.

FIGS. 3A and 3B show the stress levels under the same load conditions, in the presence of stress-relieving slit 12. These levels are coded in the same manner as in FIGS. 2A and 2B.

As shown in FIG. 3A, stress-relieving slit 12 opens under the effect of force F. This slit is delimited by proximal and distal longitudinal edges 122 and 123 that are parallel to straight edge 15, being respectively relatively closer and farther from this straight edge 15. Distal edge 123 remains essentially straight. On the other hand, proximal edge 122 separates from distal edge 123 in deforming.

As can be seen in FIG. 1, stress-relieving slit 12 is arranged in such a way that point of intersection 151 is situated facing a central point of slit 12. This central point is situated midway between two opposite longitudinal ends 121 of the slit.

As shown in FIG. 3A, proximal edge 122 is greatly separated from distal edge 123 in the center of stress-relieving slit 12, in the direction of straight edge 15, and is practically not separated from distal edge 123 at the two longitudinal edges 121 of the slit.

The stresses in the zone of point of intersection 151 are greatly reduced, this zone being assigned a stress level only coded c.

As in the preceding, the stresses on the weld seam of second structural element 20 progressively decrease roughly concentrically, moving away from point 151, from c to a, as seen in FIG. 3B.

Stress-relieving slit 12 has the effect of greatly reducing the stresses at the site of this weld seam.

Stress-relieving slit 12 is preferably arranged in the immediate vicinity of straight edge 15. The precise choice of its position is made by the expert in the field as a function of the geometric characteristics and the materials of the different elements of the structure.

This choice depends on two contradictory requirements.

It is necessary, on one hand, for the slit to be sufficiently close to straight edge 15 so that proximal edge 122 can easily deform. It is necessary, on the other hand, for it not to be too close, so that the weld seam of first structural element 10 on plate 25 is not damaged when the slit is cut in first structural element 10.

If necessary, the slit can be made along plate 25 as illustrated in FIGS. 8a and 8C. In this case, it is cut in straight edge 15 of first structural element 10, its distal edge 123 belonging then to first structural element 10 and its proximal edge 122 belonging to plate 25. This arrangement allows maximum deformation of proximal edge 122.

In the latter case, stress-relieving slit 12 cannot be cut in situ after welding of first structural element 10 to plate 25. On the contrary, the slit is cut in straight edge 15 in the workshop, and then the first structural element is mounted on plate 25.

Furthermore, stress-relieving slit 12 has, at rest, that is to say in the absence of force F, a width which is less than 2 cm in a transverse direction.

This width is essentially determined by the tool used to make the slit. It must not be too large so as not to change the inertia of first structural element 10.

If the slit works essentially under tension, that is to say if force F tends to separate proximal edge 122 from distal edge 123, the width of the slit is preferably approximately 1 mm.

If the slit works under tension and compression, that is to say if force F tends to separate proximal edge 122 and distal edge 123 or bring them closer, depending on the situation, the slit has a width of 5-20 mm. Such a slit is represented in FIG. 8A.

As shown in FIG. 1, first structural element 10 has, perpendicular to straight edge 15, a first dimension at the location of point of intersection 151, the stress-relieving slit having a longitudinal length greater than said first dimension.

This characteristic allows proximal edge 122 to be given sufficient flexibility.

Stress-relieving slit 12, at its two opposite ends 121, opens into circular holes 13 drilled in first structural element 10. These holes 13 have a diameter which is preferably at least three times the width of stress-relieving slit 12.

For a slit 5 mm wide, holes 13 have a diameter of 30 mm.

These holes have centers arranged in alignment with stress-relieving slit 12.

In the case in which the stress-relieving slit is arranged against plate 25, circular holes 13 are off-center in a direction opposite from straight edge 15.

They are delimited in this case by an edge in the shape of an arc of circle starting from distal edge 123 and extending over approximately 240°, and lengthened by a rectilinear edge up to plate 25, this rectilinear edge being perpendicular to plate 25. Holes 13 are therefore open on the side of plate 25, as shown in FIGS. 8A and 8C.

These holes make it possible to reduce the stresses applied at ends 121 of stress-relieving slit 12. In their absence, these stresses would be very great, and there would be a high risk of tearing at these ends in the long run.

The stresses around holes 13 are nevertheless high when proximal and distal edges 122 and 123 of slit 12 are separated. In order to increase the strength of this zone, first structural element 10 is reinforced around circular holes 13 by backing plates 14 represented in FIGS. 4 and 5.

Each of these plates is in the form of a steel ring that is welded to first structural element 10. Each ring has a diameter of approximately 70 mm for a hole 13 with a diameter of 30 mm, and has a central opening with the same diameter as hole 13 and aligned with it.

This type of mechanically welded structure can naturally be applied in a liquefied gas transport ship of the methane carrier type.

Such a ship is represented in FIG. 7 and has hull 30 that is elongated in the direction of normal movement of the ship, cell 40 that is delimited by partitions 50 connected to hull 30, and liquefied gas storage tank 60 that is arranged in cell 40.

Two partitions of cells 40 are mechanically welded structures of the type described above.

Each of these partitions 50 has wall 51 which constitutes intermediate element 25, at least one stiffener 52 welded to exterior surface 511 of the wall opposite from storage tank 60 and constituting first structural element 10, and at least one piece welded to interior surface 512 of wall 51 opposite from exterior surface 511, such as a stiffening gusset or anchoring element, this piece constituting second structural element 20.

In the embodiment represented in FIG. 7, each wall 51 has two second elements 20 constituting anchoring elements, storage tank 60 comprising two liquefied gas containment membranes 61 attached to these anchoring elements, stiffener 52 being subjected to forces generated by the stress applied to the anchoring elements by containment membranes 61.

These anchoring elements are anchoring bars 62 extending in planes perpendicular to stiffener 52.

Wall 51 extends in a plane perpendicular to the direction of normal advance of the ship, stiffener 52 extending in a plane perpendicular to wall 51.

Exactly the arrangement of the elements of FIG. 1 is again found here.

Stiffener 52 has two stress-relieving slits 12 arranged facing anchoring bars 62.

Other structures of the ship can have the characteristics of the mechanically welded structures described above.

A first example is represented in FIG. 4 and corresponds to a corner between transverse partition 50t and longitudinal partition 50l, these partitions being of the same type as partition 50 described relative to FIG. 7.

Transverse partition 50t has transverse wall 51t and transverse stiffener 52t welded to an exterior surface of transverse wall 51t.

Likewise, longitudinal partition 50l has longitudinal wall 51l and longitudinal stiffener 52l welded to an exterior surface of longitudinal wall 51l.

Transverse wall 51t extends in a plane perpendicular to the direction of normal movement of the ship. Longitudinal wall 51l extends in a plane parallel to the direction of normal movement of the ship. Their respective interior surfaces 512 form a right angle and have a shared edge.

Longitudinal stiffener 52l and transverse stiffener 52t extend in the same plane perpendicular to both transverse wall 51t and to longitudinal wall 51l.

Anchoring bracket 54 is welded in the corner formed by the two interior surfaces 512. This bracket is used to attach containment membrane 61 of tank 60 in the corner of cell 40.

This bracket is L-shaped and has first limb 541 extending parallel to transverse wall 51t and second limb 542 extending parallel to longitudinal wall 51l. These limbs are connected and perpendicular to one another.

The bracket has an elbow at the junction point of the two limbs that points towards the shared edge of longitudinal and transverse walls 50l and 50t.

Each of first and second limbs 541 and 542 is attached by two anchoring points 543 welded to the interior surfaces of transverse and longitudinal walls 51t and 51l, respectively.

Anchoring points 543 of first limb 541 are arranged along the edge of transverse stiffener 52t welded to transverse wall 51t.

Likewise, anchoring points 543 of second limb 542 are arranged along the edge of longitudinal stiffener 52l welded to longitudinal wall 51l.

Stress-relieving slit 12 extends in transverse stiffener 52t, facing anchoring points 543 of first limb 541 and makes it possible to limit the stresses on the welds of these anchoring points 543.

As seen in FIG. 4, anchoring point 543 closest to the longitudinal wall is arranged facing end 121 of slit 12, and anchoring point 543 farthest from the longitudinal wall is arranged facing the center of slit 12.

A second example is illustrated in FIG. 5. It relates to a partition of the type of partition 50 described relative to FIG. 7. The piece welded to interior surface 512 of wall 51 is gusset 53 supporting beam 55. Beam 55 can be used for the attachment of membrane 61 or another element whose stresses need to be taken up.

Gusset 53 has the general shape of a right triangle having support edge 531 and attachment edge 532 forming a right angle. Support edge 531 is welded to beam 55, and attachment edge 532 to interior surface 512 of wall 51.

Attachment edge 532 extends along the edge of stiffener 52 welded to wall 51. Stress-relieving slit 12 is made in stiffener 52, facing attachment edge 532 of gusset 53.

The center of slit 12 is arranged facing the end of attachment edge 532 farthest from beam 55.

A last example is represented in FIG. 6, corresponding to a corner between two partitions of the type of partition 50 described relative to FIG. 7. This configuration is very similar to that of FIG. 4, the only differences being that anchoring bracket 54 is replaced by stiffening gusset 53, and that transverse stiffener 52t extends parallel to longitudinal wall 51l and not perpendicular to it as in FIG. 4.

Gusset 53 has a first edge welded to interior surface 512 of transverse wall 51t and a second edge welded to interior surface 512 of longitudinal wall 51l.

The first edge intersects transverse stiffener 52t. Stress-relieving slit 12 is made in this stiffener and is arranged so that the first edge intersects this slit 12 at its center.

It is indeed seen, therefore, that the mechanically welded structures of the type described above are particularly well suited to liquid gas transport ships, but can also be used in any sorts of metal constructions.

The examples that have been mentioned relate essentially to ship partitions which are perpendicular to the direction of normal movement of the ship, but there is nothing to prevent the mechanically welded structures of the invention from being used to constitute partitions oriented in different directions.

An intermediate element such as a wall can be inserted between the first and second structural elements, but the first structural elements can also be welded directly to one another.

The stress-relieving slits of the invention make it possible to reduce the stresses in the different structural elements, and thus make it possible to reduce the requirements with regard to dimensioning these elements.

Savings in terms of material and economic savings can result from this.

The stresses on the weld seams being less, the regulatory controls on these weld seams can also be eased.

Finally, it should be noted that the different elements constituting the structures of the invention are typically made of carbon steel, but other materials can be used without departing from the scope of the invention.

The invention claimed is:

1. A mechanically welded structure comprising
   a first flat and thin metallic structural element extending in a plane and delimited by a straight edge on one side, and
   a second metallic structural element welded to the straight edge of the first structural element, or welded to an intermediate element connected to the straight edge and inserted between the first and second structural elements, the second structural element exerting, at at least one point of the straight edge, a force resolving into at least one component extending in the plane perpendicular to the straight edge,
   wherein the first structural element has a stress-relieving slit extending parallel to the straight edge and situated facing the point at which the force is exerted, at least one edge of the stress-relieving slit flexing to allow the stress-relieving slit to open in response to the force, the stress-relieving slit having two opposite ends, and circular holes at the two opposite ends, and the first structural element is reinforced about the circular holes by backing plates.

2. The structure according to claim 1, wherein the stress-relieving slit is arranged in the intermediate vicinity of the straight edge.

3. The structure according to claim 2, wherein the stress-relieving slit, when at rest is less than 2 cm wide.

4. The structure according to claim 1, wherein the first structural element has a shape elongated in a direction parallel to the straight edge, the first structural element having, perpendicular to the direction of the straight edge, a first dimension at the location of the point at which the force is exerted, the stress-relieving slit having, according to the direction, a length greater than the first dimension.

5. The structure according to claim 1, wherein the holes have a diameter that is at least three times the width of the stress-relieving slit.

6. The structure according to claim 1, wherein the backing plates are in the form of a ring having a central opening aligned with the circular holes.

7. A liquefied gas transport ship which has a hull, and a cell delimited by partitions connected to the hull, and a liquefied gas storage tank arranged in the cell,
   at least one of the partitions of the cell being a mechanically welded structure having a wall,
   at least one flat and thin metallic stiffener extending in a plane and welded by a straight edge to an exterior surface of the wall opposite from the storage tank, and
   a piece welded to an interior surface of the wall opposite from the exterior surface,
   said piece exerting, at least at one point of the straight edge, a force resolving into at least one component extending in the plane, perpendicular to the straight edge,
   the stiffener having a stress-relieving slit extending parallel to the straight edge and situated facing the point at which the force is exerted, at least one edge of the stress-relieving slit flexing to allow the stress-relieving slit to open in response to the force.

8. The ship according to claim 7, wherein the wall extends in a plane perpendicular to the normal direction of movement of the ship, and the stiffener extends in a plane perpendicular to the wall.

9. The ship according to claim 7, wherein the piece includes an anchoring element.

10. The ship according to claim 9, wherein the anchoring element anchors a liquefied gas containment membrane of the tank on the wall, the force applied to the stiffener being generated by the stress applied to the piece by the containment membrane.

11. The ship according to claim 10, wherein the anchoring element is a bar extending in a plane perpendicular to the stiffener.

12. A liquefied gas transport ship according to claim 7, wherein the stress-relieving slit has two opposite ends, and circular holes at the two opposite ends,
    the circular holes having a diameter that is at least three times the width of the stress relieving slit, and
    the first structural element is reinforced around the circular holes by backing plates.

13. A mechanically welded structure comprising
    a first flat and thin metallic structural element extending in a plane and delimited by a straight edge on one side, and
    a second metallic structural element welded to the straight edge of the first structural element, or welded to an intermediate element connected to the straight edge and inserted between the first and second structural elements,
    the second structural element exerting, at least at one point of the straight edge, a force resolving into at least one component extending in the plane, perpendicular to the straight edge,
    the first structural element having a stress-relieving slit extending parallel to the straight edge and situated facing the point at which the force is exerted, at least one edge of the stress-relieving slit flexing to allow the stress-relieving slit to open in response to the force,
    the first structural element having a shape elongated in a direction parallel to the straight edge,
    the first structural element having, perpendicular to the direction of the straight edge, a first dimension at the location of the point at which the force is exerted, the first dimension extending along the at least one component of the force that is exerted perpendicular to the straight edge,
    the stress-relieving slit having, according to the direction of the straight edge, a length greater than the first dimension.

14. The structure according to claim 13, wherein the stress-relieving slit has two opposite ends and two circular holes at the opposite ends, the holes having a diameter that is at least three times the width of the stress-relieving slit.

15. The structure according to claim 13, wherein the stress-relieving slit is arranged in the immediate vicinity of the straight edge.

16. The structure according to claim 13, wherein the stress-relieving slit, when at rest, is less than 2 cm wide.

* * * * *